United States Patent
Michael et al.

(10) Patent No.: US 11,281,208 B2
(45) Date of Patent: Mar. 22, 2022

(54) EFFICIENT TELEOPERATION OF MOBILE ROBOTS VIA ONLINE ADAPTATION

(71) Applicant: Carnegie Mellon University, Pittsburgh, PA (US)

(72) Inventors: Nathan Michael, Pittsburgh, PA (US); Xuning Yang, Pittsburgh, PA (US); Koushil Sreenath, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 250 days.

(21) Appl. No.: 16/291,610

(22) Filed: Mar. 4, 2019

(65) Prior Publication Data

US 2019/0271979 A1    Sep. 5, 2019

Related U.S. Application Data

(60) Provisional application No. 62/710,847, filed on Mar. 2, 2018.

(51) Int. Cl.
*G05D 1/00* (2006.01)
*G05D 3/00* (2006.01)

(52) U.S. Cl.
CPC ......... *G05D 1/0038* (2013.01); *G05D 1/0016* (2013.01); *G05B 2219/40* (2013.01); *G05B 2219/40174* (2013.01); *G05D 3/00* (2013.01)

(58) Field of Classification Search
CPC ...... G05D 1/0038; G05D 1/0016; G05D 3/00; G05B 2219/40; G05B 2219/40174
See application file for complete search history.

(56) References Cited

U.S. PATENT DOCUMENTS

| | | | |
|---|---|---|---|
| 8,170,747 B2 * | 5/2012 | Chen | G08G 1/20 701/36 |
| 9,272,418 B1 * | 3/2016 | Guerin | B25J 9/163 |
| 9,916,703 B2 * | 3/2018 | Levinson | G01S 7/497 |
| 10,627,810 B2 * | 4/2020 | Liu | G07C 5/008 |
| 2006/0135132 A1 * | 6/2006 | Cai | H04L 51/12 455/414.1 |
| 2006/0155660 A1 * | 7/2006 | Koshizen | G05B 13/027 706/18 |
| 2011/0054689 A1 * | 3/2011 | Nielsen | G05D 1/0088 700/258 |
| 2014/0371812 A1 * | 12/2014 | Ackermann | A61H 21/00 607/46 |

(Continued)

FOREIGN PATENT DOCUMENTS

WO    WO-2006113755 A2 *    10/2006    ............ B25J 9/1664

*Primary Examiner* — Behrang Badii
*Assistant Examiner* — Jay Khandpur
(74) *Attorney, Agent, or Firm* — Kacvinsky Daisak Bluni PLLC (57) ABSTRACT

Described herein is a framework for efficient task-agnostic, user-independent adaptive teleoperation of mobile robots and remotely operated vehicles (ROV), including ground vehicles (including legged systems), aircraft, watercraft and spacecraft. The efficiency of a human operator is improved by minimizing the entropy of the control inputs, thereby minimizing operator energy and achieving higher performance in the form of smoother trajectories by concurrently estimating the user intent online and adaptively updating the action set available to the human operator.

18 Claims, 5 Drawing Sheets

(56) References Cited

U.S. PATENT DOCUMENTS

| | | | |
|---|---|---|---|
| 2014/0371912 A1* | 12/2014 | Passot | G06N 3/008 700/264 |
| 2015/0285834 A1* | 10/2015 | Shibuya | G01P 15/0802 702/150 |
| 2016/0299507 A1* | 10/2016 | Shah | G01C 21/203 |
| 2017/0061828 A1* | 3/2017 | Artemiadis | G09B 23/30 |

* cited by examiner

Algorithm 1 Algorithm for updating construction of the subsampled set online
───────────────────────────────
1: $\Gamma_{t+1} \leftarrow \{\gamma_i\}; i = 1, \ldots, N; \Gamma_{t+1} \sim U(a,b)$
2: $\bar{\Gamma}_{t+1} \leftarrow \emptyset$
3: for $n = 1 : N$ do
4:    Calculate weights for each motion primitive $w_n = p(\hat{R}|\gamma_{t-m:t}, \gamma_{t+1}^n)$
5: end for
6: for $k = 1 : K$ do
7:    Draw $\gamma_k \in \Gamma_t$ with probability $w_k$ with replacement
8:    $\bar{\Gamma}_{t+1} \leftarrow \bar{\Gamma}_{t+1} + \gamma_n$
9: end for
10: return $\bar{\Gamma}_{t+1}$
───────────────────────────────

EFFICIENT TELEOPERATION OF MOBILE ROBOTS VIA ONLINE ADAPTATION

RELATED APPLICATIONS

This application claims the benefit of U.S. Provisional Application No. 62/710,847, filed Mar. 2, 2018, which is incorporated herein by reference in its entirety.

GOVERNMENT RIGHTS

This invention was made with government support under contract N00014-13-1-0821 awarded by the Office of Naval Research. The government has certain rights in this invention.

FIELD OF THE INVENTION

This invention is related to the field of robotics, and, in particular to the improvement of human control of mobile robots with adaptive teleoperation.

BACKGROUND OF THE INVENTION

For high-dimensional nonlinear robotic systems the choice of using teleoperation has been the preferred method of control and planning for navigating robots in unfamiliar scenarios. With teleoperation, human intuition can be leveraged to improve task performance, as humans can alleviate computational demands of perception and semantic inference required to generate real-time, dynamically feasible trajectories for an autonomous mobile robot.

Humans are imperfect controllers that are prone to physiological stress, fatigue and inexperience, as well as random errors. In addition, efficient control of a robotic system derives from experience interacting with the robot, such that the operator "internalizes" the dynamics of the robot. The operator learns the dynamics of the vehicle by exploring the available actions and observing feedback of the change in the robot state, either visually or haptically.

Effectively, the user is implicitly learning the mapping from the external input to the robot's dynamics and mastery is achieved when the user is able to invert the dynamics to issue commands. The learning time for any user is correlated with the complexity of the system. In high-dimensional systems such as aerial robots, this is especially difficult due to the coupling in dynamics.

Prior work in introducing automation to assist operators in controlling robotic systems has primarily focused on leveraging information about the environment to augment the user input with an optimal action to reach the predicted goal of the operator. A direct method is to leverage shared autonomy in combining an autonomous assistive input with the user input, based on varying levels of desired human intervention.

The dominant methodology in shared autonomy is arbitration of the user policy with a predicted policy. In these frameworks, the robot typically infers the desired goal, trajectory, or task that the user wishes to achieve. An arbitration function blends the input from the prediction and the user input, with the blended input passed to the robot. These methods are suited for episodic tasks with a terminating goal, where a finite set of global goals are evaluated probabilistically. Similarly, classification methods to identify tasks have also been employed. One such method utilizes a recursive Bayesian filter to infer the appropriate scenario, such as doorway crossing and pole inspection, to generate the appropriate robot input to be arbitrated with the user input. The user model and the arbitration function employed in these formulations are generally trained or defined a priori, and require stringent assumptions with respect to operator proficiency, environmental restrictions, and system limitations. Instead of linear arbitration a Bayesian approach may be used in combining inputs that eliminates the explicit definition of a particular arbitration function, as commonly employed by previous works. Combined with a pre-trained user model, inference over the viable trajectories in a known configuration space modifies the control of the user using a Markov model. For applications such as remote access mobile robot operation in unknown environments, lack of required prior information on explicit goal definition and user models renders these methods of assistance inadequate.

SUMMARY OF THE INVENTION

Described herein is a framework for efficient task-agnostic, user-independent adaptive teleoperation of mobile robots and remotely operated vehicles (ROV), including ground vehicles (including legged systems), aircraft, watercraft and spacecraft. The robot typically assumes a passive role in teleoperation and human-in-the-loop systems. For robots sensitive to high frequency disturbances and input noise, teleoperation by the operator requires time-critical vigilance and reactive effort to keep the robot stable, as well as to navigate the robot to achieve some task or goal. The framework increases efficiency by means of robustness and assistance in the form of adaptation.

To achieve robustness, the framework introduces a novel teleoperation method by specification of local trajectories called motion primitives, which are parameterized trajectories based on the input and the system dynamics. To assist the operator, the system predicts the operator intent and adapts the set of available actions to the operator based on the predicted intent. The system can enable safe and efficient teleoperation in high disturbance scenarios by leveraging the robot's robust onboard control systems to enhance a human's capabilities to identify and navigate in unknown scenarios.

The operator efficiency in robot control can be improved by actively aiding the operator by methods of feedback, without requiring or assuming access to prior knowledge of the task, environment, or the user. Specifically, efficiency of the operator is improved by minimizing the entropy of the control inputs, thereby minimizing operator energy and achieving higher performance in the form of smoother trajectories.

The framework concurrently estimates user intent online and adaptively updates the action set available to the operator. This framework establishes equivalence between the action space and trajectories via the use of motion primitives and formulates the operator as an optimal controller. As such, the dependency of the user model on the environment is removed and inference of operator intent using recent operator action selection is achieved.

Figure 1:
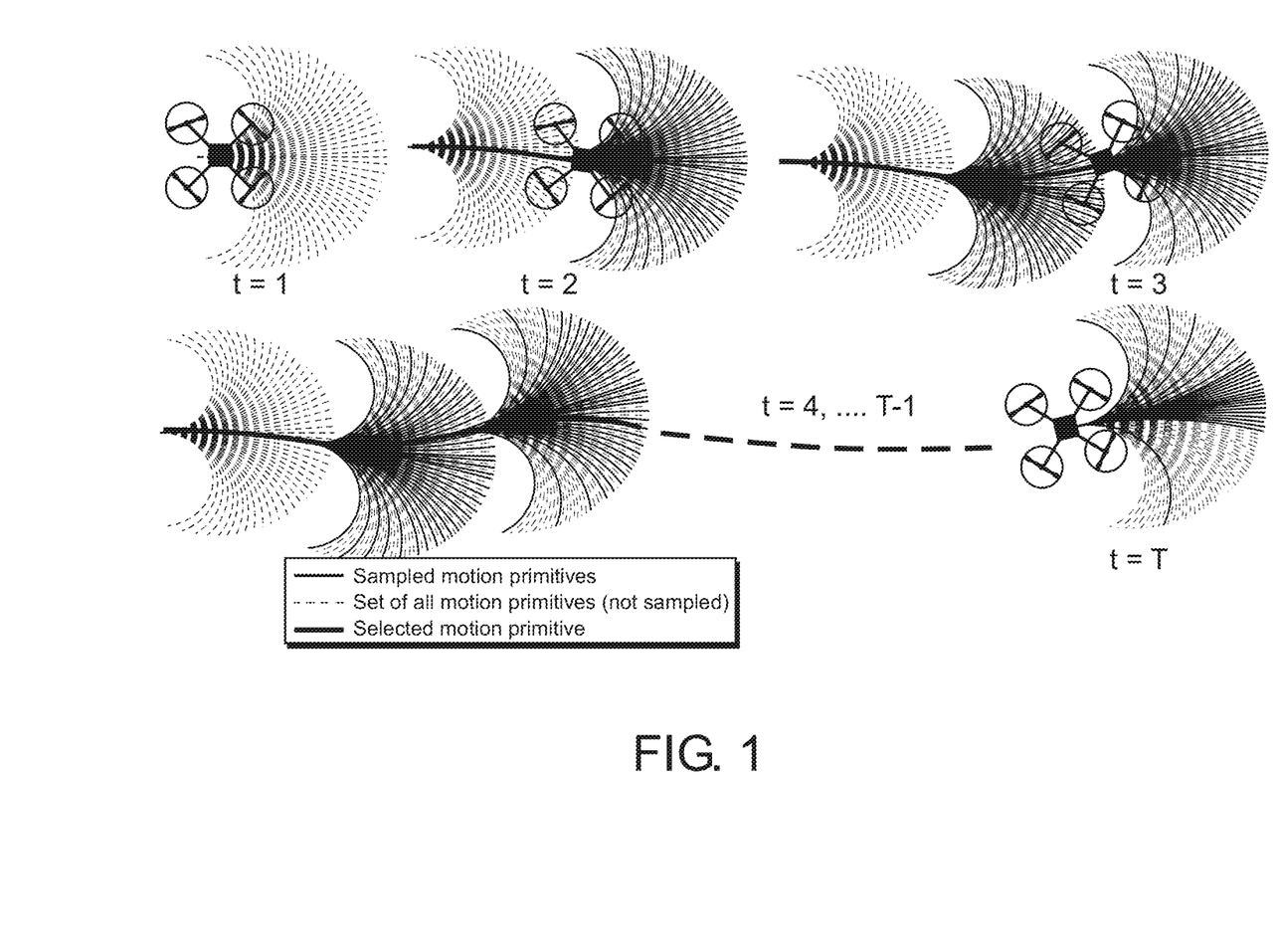
FIG. 1 is a depiction of the subset of the motion primitive library available to the user for selection changing over time based on dynamically feasible motions given the current state of the robot and previously selected motion primitives.

In operation, a user selects a robot motion from a finite set of dynamically feasible and safe motions, represented as a set of motion primitives in a motion primitive library. User intent is modeled as a probabilistic distribution with respect to future actions that represents the likelihood of action selection given recent user input, which can be formulated independent of task, environment, or user. As the intent model becomes increasingly confident, the action set is adapted to reduce the error between the intended and actual performance. FIG. 1 shows how the subset of possible motion primitives changes over time based on the state of the robot and the determined user intent.

DETAILED DESCRIPTION OF THE INVENTION

Traditional control methodologies of mobile robot teleoperation compute the desired motion reference with respect to a velocity reference provided by an external input device (e.g. a joystick, a steering wheel, etc.). An alternate strategy is to represent the action space as a set of pre-computed motion primitives, called a motion primitive library (MPL). Instead of employing the external inputs as velocity references, the external input becomes a selector function that corresponds to a specific motion primitive at each instance in time. Motion primitives can be computed in advance and designed to ensure dynamic feasibility and vehicle stability assuming nominal operating conditions.

Figure 2:
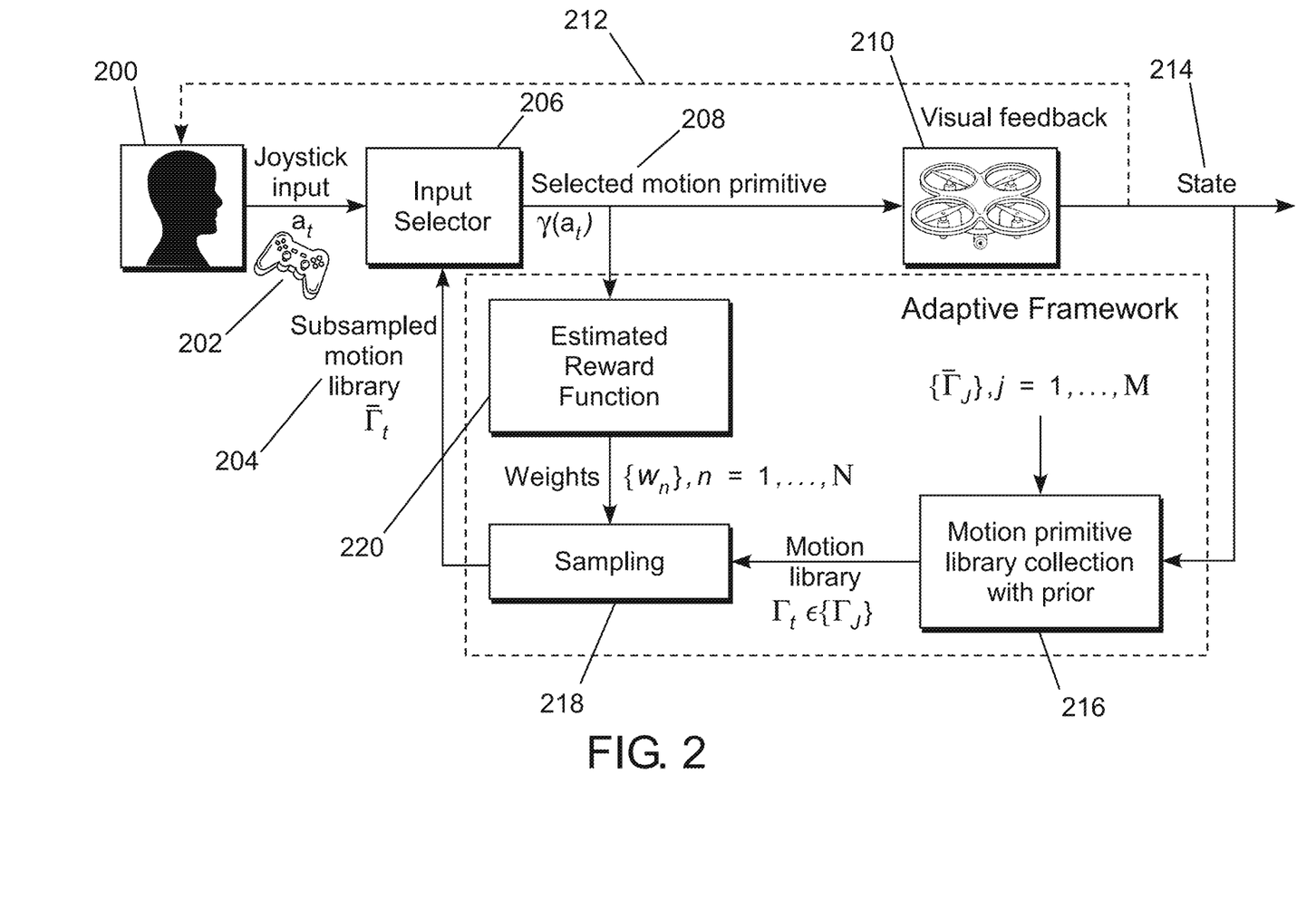
FIG. 2 is a high-level block diagram of one embodiment of the invention

FIG. 2 shows a high-level block diagram of one embodiment of the invention. A user 200 provides input to the robot using a controller, for example, a joystick input 202. A collection of allowed motion primitives 204 is supplied to input selector 206. Input selector 206 selects a motion primitive from motion primitive collection 204 based on a closest match between the parameters of a motion primitive and the input provided by user 200 via controller 202. Selected motion primitive 208 is sent to the mobile robot to be executed by the robot as an actual motion. User 200 may be assisted in providing input via the controller 202 based on visual feedback 212. The current state of the robot 214 is provided and used to select a motion primitive library 216 containing collection of motion primitives. The motion primitives contained in motion primitive library 216 contain a collection of motion primitives that are both dynamically feasible and safe for robot 210 to execute. The motion library is sampled at 218, with the sampling centered around a determined user intent. An estimated reward function 220 based upon a previous pre-determined number of selected motion primitives is used to provide weights for the motion primitives in motion primitive library 216. Based on the weighting, the subset of allowed motion primitives 204 is selected and sent to input selector 206 for selection in the next time period. In an alternative embodiment, the motion primitive library 216 may be calculated dynamically based upon the state of the robot 214 and the environment instead of selected from a pre-calculated collection of libraries based on the state of the robot 214.

An action can be defined as $a=\{a_1, \ldots, a_q\}$ for q input dimensions. A corresponding motion primitive generated using an action may be denoted by $\gamma(\alpha)$. An MPL, $\Gamma=\{\gamma_i(\alpha_i)\}$, $i=1, \ldots, N$, is generated via an action set of size N, $\{\alpha_i\}$, $i=1, \ldots, N$. The set of MPL can be further defined to be a motion primitive library collection, denoted by $\{\Gamma_j\}$, $j=1, \ldots, M$.

A parameterized action formulation for ground and air vehicles is chosen based on forward-arc motion primitives that propagate the dynamics of a unicycle model with a constant linear, angular, and vertical velocity for a specified amount of time, T. The motion primitives are given by the solutions to the unicycle model:

$$x_{t+T} = x_t + \begin{bmatrix} \frac{v_{xt}}{\omega_t}(\sin(\omega_t T + \theta_t) - \sin(\theta_t)) \\ \frac{v_{xt}}{\omega_t}(\cos(\theta_t) - \cos(\omega_t T + \theta_t)) \\ v_{zt}T \\ \omega_t T \end{bmatrix} \quad (1)$$

where $x_t=[x_t, y_t, z_t, \theta_t]^T$ represents the pose of the vehicle at time t, and $v_{xt}$, $v_{zt}$ and $\omega_t$ are the linear and angular velocities of the vehicle at time t in the body frame, respectively. Hence, the action space of the vehicle is given by uniformly dense sets: $v_x=\{v_{xi}\}$, $i=1, \ldots, N_{xv}$, $\Omega=\{\omega_j\}$, $j=1, \ldots, N_\omega$, $v_z=\{v_{zk}\}$, $k=1, \ldots, N_{vz}$.

A forward-arc motion primitive at each time t is represented by $\gamma_t=\{\alpha_t, T\}$, with $\alpha_t=\{v_{xt}, v_{zt}, \omega_t\}$. For ground vehicles, the heading of the vehicle is fixed to the yaw of the vehicle. Although aerial platforms such as quadrotors can independently control heading from yaw, the use of a unicycle model is maintained by ensuring that the heading is equivalent to the yaw of the vehicle, as humans naturally optimize for curved trajectories in robot control.

Figure 3A:
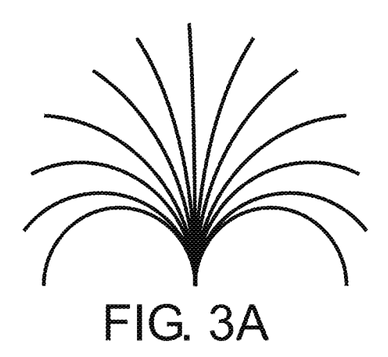
FIGS. 3A and 3B show examples of the MPLs for ground and air vehicles, respectively.
Figure 3B:
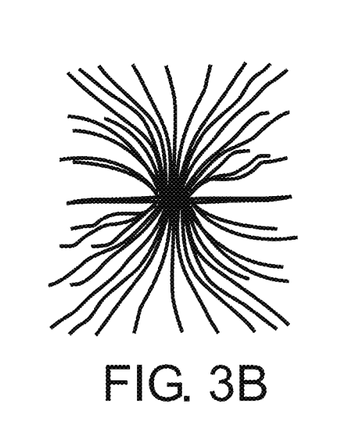

To ensure continuity in the selection of motion primitives such that the trajectory followed by the vehicle is smooth, an MPL collection is generated based on a set of finely discretized initial states in the higher derivatives. The MPL in the collection to which the initial condition is sufficiently close is chosen to be the motion library at each time t. An example of the forward-arc MPL is shown in FIGS. 3A and 3B for ground and air vehicles, respectively.

Figure 3C:
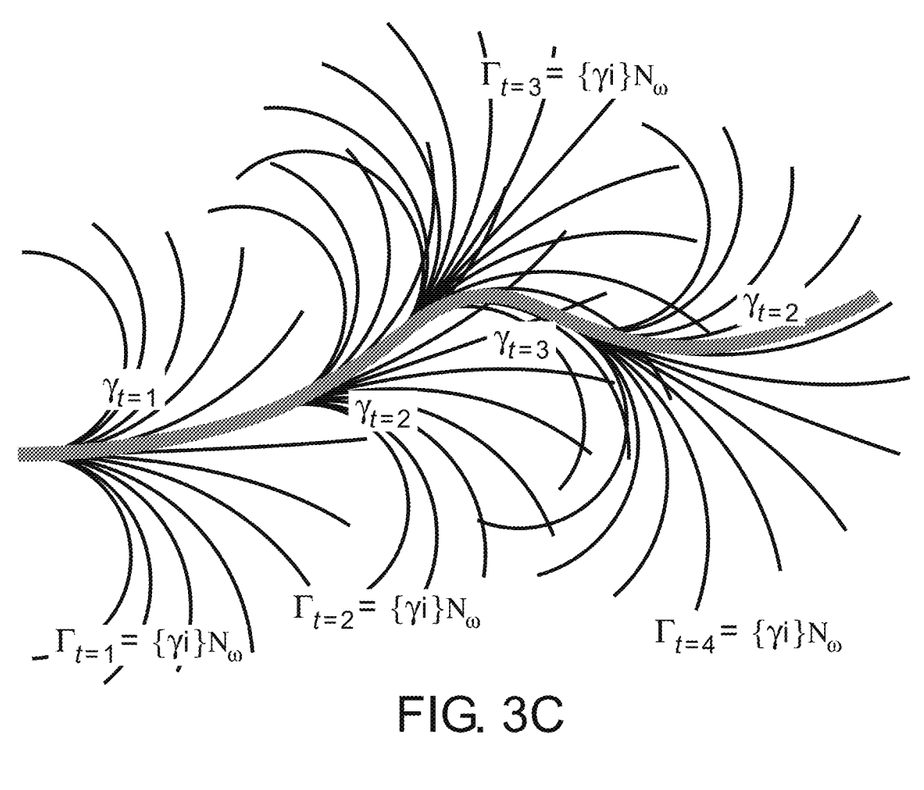
FIG. 3C depicts the MPL selected at each time t with the initial condition matching that of the current robot state, thereby forming a smooth trajectory.

FIG. 3C depicts the MPL selected at each time t with the initial condition matching that of the current robot state. The selected motion primitive at each time t forms a smooth trajectory.

Operator behavior can be represented by modeling the underlying intent of the operator as an optimal controller. It may be assumed that the operator is a rational, single intent agent with smooth transitions in movements. Specifically, the operator inherently optimizes a reward function, but the choices of actions at each time step poorly reflect this function. Because the operator is assumed to achieve single intent tasks in this scenario, the reward function is assumed to not depend on time. At each input time t, the operator issues action a which is in some neighborhood of the optimal action a*:

$$a^* = \mathrm{argmax}_a R_t(\gamma(a)) \approx \mathrm{argmax}_a \sum_i^P \alpha_t^i \phi_t^i(\gamma(a)) \quad (2)$$

where $\phi^i$'s are basis functions that describe intrinsic natural human or robot behavior that operators may seek to optimize, and $\alpha^i$'s are their corresponding weights for P basis functions. The reward function can be described with linear basis terms, however other representations can also be used. The underlying reward function $\hat{R}_t = \Sigma_i^P \hat{\alpha}^i \phi_t^i$ can be inferred from a series of noisy user inputs $\{\alpha_{t-m}, \alpha_{t-m+1}, \ldots, \alpha_{t-1}\}$.

Using this model, the inference over the user behavior becomes the solution to the problem:

$$\hat{\gamma}_{t+1} = \underset{\gamma_{t+1}(a_{t+1})}{\operatorname{argmax}} R_t(\gamma_{t-m:t}(a_{t-m:t}), \gamma_{t+1}(a_{t+1})) \quad (3)$$

$$= \underset{\gamma_{t+1}}{\operatorname{argmax}} \sum_i^P \alpha_t^i \phi_t^i(\gamma_{t-m:t}, \alpha_{t+1})$$

where $\gamma_{t-m:t} = \{\gamma_{t-m}, \gamma_{t-m+1}, \gamma_t\}$ represents a trajectory from the past m motion primitives, and $\gamma_{t+1} \in \Gamma_{t+1}$.

As user inputs are directly mapped to motion primitives, actions and motion primitives $\gamma_t$ are equivalent for some fixed duration T. This formulation removes the dependence of trajectories on the continuous input space, thus allowing inference to be made over motion primitives.

The behavior recognition and prediction update for a user is computed based on a distribution over the set of all motion primitives, given the traveled trajectory and an estimate of the reward function. For generality, it is assumed that the prediction window can be selected to accommodate temporal basis functions if needed. The probability of a motion primitive being selected given the past m motion primitives is given by:

$$p(\gamma_{t+1} | \gamma_{t-m:t}, \hat{R}_t) = \frac{p(\hat{R}_t | \gamma_{t-m:t}, \gamma_{t+1}) p(\gamma_{t+1} | \gamma_{t-m:t})}{p(\hat{R}_t | \gamma_{t-m:t})} \quad (4)$$

$$= \eta p(\hat{R}_t | \gamma_{t-m:t}, \gamma_{t+1}) p(\gamma_{t+1} | \gamma_{t-m:t})$$

where $p(\hat{R} | \gamma_{t-m:t}, \gamma_{t+1})$ is a distribution over the estimated reward function of the user and $\eta$ is a normalization weight.

To infer the true underlying reward function from a past window of m motion primitives, a belief distribution of the reward, $p(\hat{R}_t | \gamma_{t-m:t}, \gamma_{t+1})$, given the set of motion primitives, is constructed via an online function approximation to estimate the reward function $\hat{R}_t(\gamma_{t-m:t}, \gamma_{t+1}) = \Sigma_i^P \hat{\alpha}^i \phi_t^i(\gamma_{t-m:t}, \gamma_{t+1})$. This function is estimated using Locally Weighted Projection Regression (LWPR), a computationally efficient online method for local approximations or high-dimensional nonlinear functions. The incremental algorithm performs global function approximation by taking a weighted sum of the local regressors that influence the region. Note that this formulation of operator intent is task independent unless the basis functions incorporate environment or task information.

The regression over the reward bases is defined with respect to a linear global reward function that is estimated using LWPR:

$$\hat{R}_t = \sum_i^P \hat{\alpha}^i \phi_t^i = \frac{1}{\sum_j^Q d_j} \sum_j^Q d_j \hat{y}_j \quad (5)$$

$$= \hat{\alpha}^T \Phi_t = \frac{1}{\sum_j^Q d_j} \sum_j^Q d_j (\beta_j^T \Phi_j)$$

where $\hat{y}_j = \beta_j^T \Phi_j$ are the individual receptive fields used in LWPR, and $d_j$ is the measure of locality of the $j^{th}$ receptive field, out or a total of Q receptive fields.

The online estimation of the user behavior provides insight into the prediction of the user behavior based on hindsight, which can be constructively utilized to aid the choice of selection in the control of the robot. Using the update Eq. (4), the framework infers an empirical distribution over the uniform, dense set of all motion primitives. The model prior is iteratively adapted following Eq. 4. At each time step, the prior reflects the distribution of the likelihood of the user selecting the next motion primitive that maximizes their intent function based on the estimate of the reward function at the previous time step.

Figure 4:
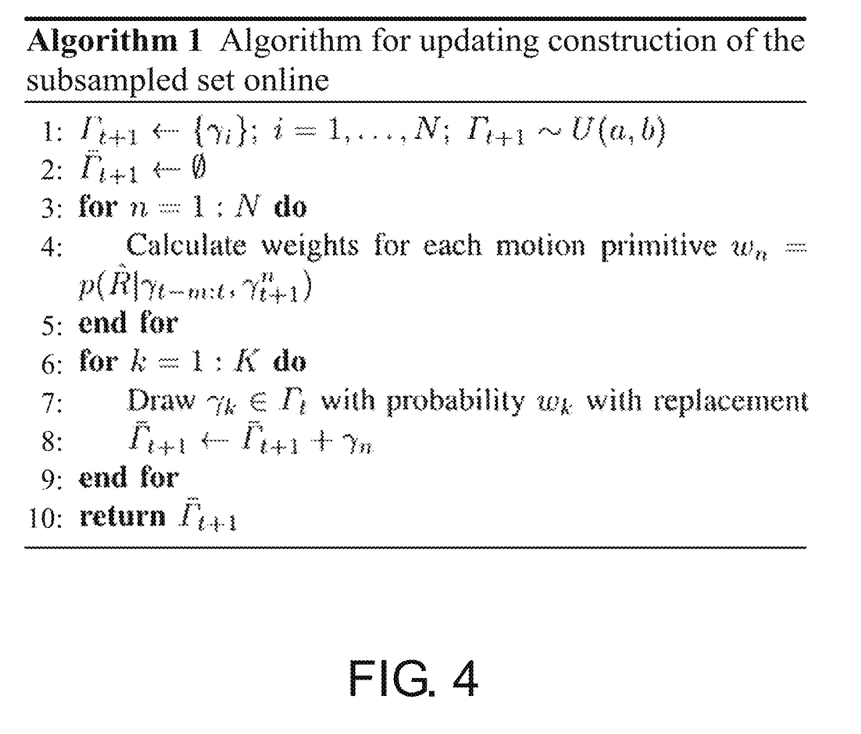
FIG. 4 shows the algorithm for selecting the allowed subset of motion primitives

The subset of available motion primitives can be adaptively modified from an underlying, dense uniform discretization, such that the density of the subsampling reflects the reward function distribution, $p(\hat{R} | \gamma_{t-m:t}, \gamma_{t+1})$. Adaptation of the allowable set of motion primitives provides fine-grained control of the action to be taken by the robot and expels inputs misaligned with the user's underlying intent. By construction, selected motions from the subsampled set closely advance the user's underlying intention and circumvent misaligned motions to the user's interest. The key assumption here is that the human operator follows a satisficing property, i.e. the user tends to converge and operate near a small set of actions that are within the region of interest, unless the region of interest changes. Sampling from a dense, underlying set of motion primitives with respect to a belief distribution that reflects the operator's predicted intent allows the user with full control by providing finer precision control near the region of interest while eliminating noisy inputs. The algorithm for selecting the subset of available motion primitives is shown in FIG. 4.

Let the weight of the $n^{th}$ motion primitive be $\omega_n = p(\hat{R} | \gamma_{t-m:t} \gamma_{t+1})$. Given a motion primitive library $\Gamma$ of size N, we sample K motion primitives using the weights $\{\omega_n\}$, $n=1, \ldots, N$ with replacement such that we obtain a subsampled set $$\bar{\Gamma} = \{\gamma^k\} \subseteq \Gamma, k=1, \ldots, K$$

The choice of motion primitive is limited to this set. Using the selector function shown in Eq. 6, the motion primitive with the closest parameterization of the actual joystick value $\alpha_{joy}$ is selected.

$$\gamma_{selected} = \gamma \left\{ \underset{a}{\operatorname{argmin}} a - a_{joy} \right\} \in \bar{\Gamma} \quad (6)$$

Figure 5:
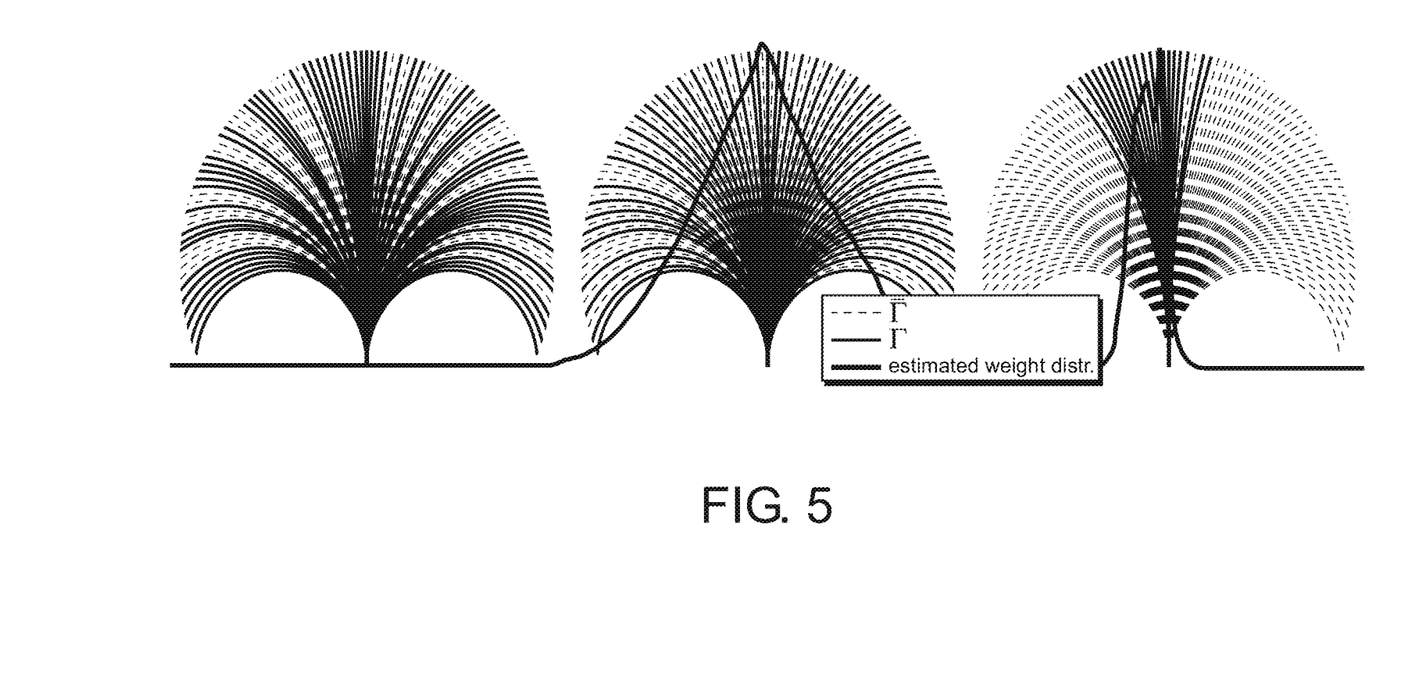
FIG. 5 shows motion distributions over times showing the prediction of the motion primitive becomes more peaked at the mean of the predicted motion primitive.

A visualization of this algorithm is provided in FIG. 5. Motion primitives and distribution over the motion primitives is shown for selected times for an aerial robot along a racetrack at t=0, t=5 and t=150. The prediction becomes more peaked near the mean of the predicted motion primitive.

Joystick Steering Entropy is a direct, on line method to efficiently evaluate the workload performance of an operator given continuous inputs, without asking the operator to deviate their focus. Steering entropy quantifies the smoothness of the operator's actions directly from past inputs such that only hindsight information is used. Steering entropy is used herein to measure the efficiency of the operator for each trial. Given a continuous input $u \in \mathbb{R}$, the input error is derived from the difference between a second order Taylor approximation of the input at time t with the actual input provided by the user:

$$e_t = u_t - \hat{u}_t \quad (7)$$

where $$\hat{u}_t = u_{t-1}(u_{t-1} - u_{t-2}) + \tfrac{1}{2}((u_{t-1} - u_{t-2}) - (u_{t-2} - u_{t-3})) \quad (8)$$

A frequency distribution of the error is then constructed and divided into 9 bins. The total steering entropy, Hp, for each run is given by:

$$Hp = \Sigma_i - P_i \log_9 P_i \quad (9)$$

A slight modification to the algorithm is made by padding the proportion of each bin by e to avoid asymptotes:

$$P_i = \frac{n_i}{\sum_i n_i} + e, i, \ldots, 9 \quad (10)$$

As efficiency increases, the steering entropy decreases accordingly.

A task-independent adaptive teleoperation methodology that seeks to improve operator performance and efficiency by concurrently modeling user intent and adapting the set of available actions according to the predicted intent has been set forth herein. The framework may be used by any human-controlled mobile robot and the invention is not meant to be limited by specific uses, but instead, the scope of the invention is set forth in the following claims.

The invention has certain advantages in situations having a high latency between the operator and the robot. In one embodiment, the underlying mathematical form from which high-frequency control references are generated locally are transmitted to the robot rather than sending the high-frequency control references directly. As such, sensitivity to latency is greatly decreased as the high-frequency control references typically susceptible to round-trip latency performance and stability degradation are replaced with primitive objects that are less effected by latency. In another embodiment, recommendations are sent to the robot of how it should move in response to remote operator guidance in a mathematical form that the robot can transform into local high frequency references. Should the reference be delayed or lost, a prior motion plan is already operational and being executed in a stable manner. The lower-level references that would be more susceptible to latency are not sent, but instead the system on the robot is trusted to make its own local decisions to ensure stability.

In preferred embodiments, the system implementing the method of the invention will be present on board the mobile robot and will consist of, for example, a processor running software to perform the steps of the method. The method may share memory and processor with, and may be implemented as part of, the control system for the robot. The method will preferably include a communications channel to the control software of the robot enabling the method to receive information regarding the current state of the robot as well as input from environmental sensors. In preferred embodiments, the robot may be teleoperated via a wireless connection by a user having a means for providing input controls used for determining the selected motion primitive, for example, a joystick or steering wheel.

We claim:

1. A method comprising iterating, for each of a plurality of discrete time steps during a time period of operation of a robot, the steps of:
    receiving a current state of the robot;
    selecting a set of motion primitives that are dynamically feasible and safe for the robot to execute during the current time step, given the current state of the robot, wherein each motion primitive is a parameterized trajectory based on system dynamics of the robot;
    predicting a user intent of an operator of the robot based on one or more motion primitives executed by the robot during one or more previous time steps;
    selecting a subset of motion primitives comprising one or more motion primitives from the set of motion primitives based on the predicted user intent;
    receiving a current input from the operator; and
    selecting, as the motion primitive to be executed by the robot during the current time step, the motion primitive from the selected subset of motion primitives having a closest match to the current input from the operator.

2. The method of claim 1 wherein selecting the set of motion primitives comprises:
    determining a range of motion which is dynamically feasible given the current state of the robot; and
    discretizing the range of motion into the selected set of motion primitives.

3. The method of claim 2 wherein selecting a set of motion primitives further comprises:
    receiving one or more sensed environmental conditions; and
    limiting the range of motion to a safe range given the sensed environmental conditions.

4. The method of claim 1 wherein one or more sets of motion primitives are pre-computed and associated with a state of the robot, further comprising:
    selecting the set of motion primitives from the one or more pre-computed sets of motion primitives, the selected set of motion primitives being the pre-computed set of motion primitives having a closest match to the current state of the robot.

5. The method of claim 4 further comprising:
    receiving one or more sensed environmental conditions; and
    eliminating unsafe motion primitives from the selected set of pre-computed motion primitives, wherein the unsafe motion primitives are determined based on the sensed environmental conditions.

6. The method of claim 1 wherein the user intent is a probabilistic distribution, further comprising:
    selecting the subset of motion primitives by selecting motion primitives from the set of motion primitives which are closest to a center of the probabilistic distribution.

7. The method of claim 6 wherein the granularity of the selected subset of motion primitives is broader based on the user input having a greater range of change over a predetermined number of iterations of the discrete steps of the method.

8. The method of claim 6 wherein the granularity of the selected subset of motion primitives is narrower based on the user input having a lesser range of change over a predetermined number of iterations of the discrete steps of the method.

9. The method of claim 6 wherein the probabilistic distribution represents a likelihood of selection of a particular motion primitive from the selected subset of motion primitives given one or more motion primitives executed by the robot during one or more previous time steps.

10. The method of claim 6 further comprising:
estimating a reward function based on a trajectory generated from motion primitives executed by the robot during a predetermined number of previous time steps;
assigning a weight to each motion primitive in the set of motion primitives based on the reward function; and
selecting a predetermined number of the weighted motion primitives having the highest weights for inclusion in the selected subset of motion primitives.

11. A system comprising:
a mobile robot;
an interface to a control for providing operator inputs;
a processor and memory onboard the robot, the memory containing software executing on the processor and iterating, during each of a plurality of discrete time steps during a time period of operation of the robot, the functions of:
receiving a current state of the robot;
selecting a set of motion primitives that are dynamically feasible and safe for the robot to execute for the current time step, given the current state of the robot, wherein each motion primitive is a parameterized trajectory based on system dynamics of the robot;
predicting a user intent of an operator of the robot based on one or more motion primitives executed by the robot during one or more previous time steps;
selecting a subset of motion primitives comprising one or more motion primitives from the set of motion primitives based on the predicted user intent;
receiving a current input from the operator; and
selecting, as the motion primitive to be executed by the robot for the current time step, the motion primitive from the selected subset of motion primitives having a closest match to the current input from the operator.

12. The system of claim 11 wherein, to select a set of motion primitives, the software performs the further functions of:
determining a range of motion which is dynamically feasible given the current state of the robot;
receiving one or more sensed environmental conditions;
limiting the range of motions to a safe range given the sensed environmental conditions; and
discretizing the limited range of motion into the selected set of motion primitives.

13. The system of claim 11 wherein one or more sets of motion primitives are pre-computed and associated with a state of the robot, the software performing the further functions of:
selecting the set of motion primitives from the one or more pre-computed sets of motion primitives, the selected set of motion primitives being the pre-computed set of motion primitives having a closest match to the current state of the robot;
receiving one or more sensed environmental conditions; and
eliminating unsafe motion primitives from the selected set of motion primitives, the unsafe motion primitives determined based on the sensed environmental conditions.

14. The system of claim 11 wherein the user intent is a probabilistic distribution, further comprising:
creating the selected subset of motion primitives by selecting motion primitives from the set of motion primitives which are closest to a center of the probabilistic distribution.

15. The system of claim 14 wherein the granularity of the selected subset of motion primitives is broader based on the user input having a greater range of change over a predetermined number of iterations of the discrete steps of the method.

16. The system of claim 14 wherein the granularity of the selected subset of motion primitives is narrower based on the user input having a lesser range of change over a predetermined number of iterations of the discrete steps of the method.

17. The system of claim 14 wherein the probabilistic distribution represents a likelihood of selection of a particular motion primitive from the selected subset of motion primitives given one or more motion primitives executed by the robot during one or more previous time steps.

18. The system of claim 14, the software performing the further functions of:
estimating a reward function based on a trajectory generated from motion primitives executed by the robot during a predetermined number of previous time steps;
assigning a weight to each motion primitive in the set of motion primitives based on the reward function; and
selecting a predetermined number of the weighted motion primitives having the highest weights for inclusion in the selected subset of motion primitives.

* * * * *